(12) United States Patent
Levandoski et al.

(10) Patent No.: US 8,921,490 B2
(45) Date of Patent: Dec. 30, 2014

(54) ULTRAFAST HEAT/ROOM TEMPERATURE ADHESIVE COMPOSITION FOR BONDING APPLICATIONS

(75) Inventors: Susan L. Levandoski, Bristol, CT (US);
Alan E. Litke, Waterbury, CT (US);
Teresa A. Love, Bloomfield, CT (US)

(73) Assignee: Henkel US IP LLC, Rocky Hill, CT (US)

( * ) Notice: Subject to any disclaimer, the term of this patent is extended or adjusted under 35 U.S.C. 154(b) by 952 days.

(21) Appl. No.: 12/495,139

(22) Filed: Jun. 30, 2009

(65) Prior Publication Data
US 2010/0331462 A1 Dec. 30, 2010

(51) Int. Cl.
| | | |
|---|---|---|
| C08L 53/02 | (2006.01) |
| C09J 153/02 | (2006.01) |
| C08K 5/50 | (2006.01) |
| C09J 4/06 | (2006.01) |
| C08K 5/00 | (2006.01) |
| C08F 220/06 | (2006.01) |
| C08F 220/14 | (2006.01) |
| C08F 220/18 | (2006.01) |
| C08F 222/10 | (2006.01) |

(52) U.S. Cl.
CPC .............. *C09J 4/06* (2013.01); C08K 5/0041 (2013.01); C08K 5/005 (2013.01); C08K 5/50 (2013.01); *C09J 153/02* (2013.01); C08F 220/06 (2013.01); C08F 220/14 (2013.01); C08F 220/18 (2013.01); C08F 2222/1013 (2013.01); C08F 2222/1026 (2013.01)
USPC ........... 525/262; 525/263; 525/264; 525/244; 525/315; 525/242; 524/505

(58) Field of Classification Search
CPC .......... C09J 153/02; C08L 53/02; C08K 5/50; C08K 5/5333
USPC ................ 525/242, 315, 244, 262, 263, 264; 524/505
See application file for complete search history.

(56) References Cited

U.S. PATENT DOCUMENTS

| | | | |
|---|---|---|---|
| 3,832,274 A | | 8/1974 | Owston |
| 4,355,091 A | * | 10/1982 | MacLeish et al. ............ 430/216 |
| 4,536,546 A | * | 8/1985 | Briggs ............................. 525/83 |
| 4,574,142 A | * | 3/1986 | Charnock ...................... 525/305 |
| 4,942,201 A | * | 7/1990 | Briggs et al. .................... 525/71 |
| 5,512,608 A | | 4/1996 | Bachmann |
| 5,637,141 A | * | 6/1997 | Puzic et al. ................... 106/274 |
| 2004/0077766 A1 | | 4/2004 | De Cooman et al. |
| 2007/0155879 A1 | * | 7/2007 | Osae et al. .................... 524/376 |
| 2007/0270546 A1 | * | 11/2007 | Yang et al. ...................... 525/88 |

FOREIGN PATENT DOCUMENTS

WO    WO 2009/009009    1/2009

OTHER PUBLICATIONS

Leaversuch Plastics Technology 2002.*
International Search Report for International Application No. PCT/US2010/040587 mailed Feb. 28, 2011.

* cited by examiner

*Primary Examiner* — Mark Kaucher
(74) *Attorney, Agent, or Firm* — Steven C. Bauman

(57) ABSTRACT

The present invention relates to curable compositions which are capable of safely and sufficiently bonding components of electrical devices. In particular, the invention relates to two-part, halogen-free curable compositions which are capable of rapidly curing at room temperatures as well as at elevated temperatures.

15 Claims, No Drawings

ULTRAFAST HEAT/ROOM TEMPERATURE ADHESIVE COMPOSITION FOR BONDING APPLICATIONS

FIELD OF THE INVENTION

The present invention relates to curable adhesive compositions. More particularly, the invention relates to two-part, halogen-free adhesive compositions which are curable in heat or in room temperature.

BRIEF DESCRIPTION OF RELATED TECHNOLOGY

Curable adhesive compositions have been used in a variety of applications, including bonding of components in various hand-held devices. However, in order to achieve a suitable strength after curing, traditional curable compositions include halogenated components. Such halogenated components provide suitable adhesion and strength to the cured composition, but have been found to be highly corrosive to the products. Of particular concern are personal electronic products, which may be easily damaged upon exposure to corrosive components.

It has heretofore been difficult to achieve a halogen-free curable composition, which is capable of providing the requisite adhesiveness and strength required of various products. Generally, in order to achieve a composition with the high impact strength required of personal electronic products, curable compositions required halogenated elastomers as a main component. Further, traditional compositions are only suitable for room temperature curing.

It is thus desired to provide a rapid curing, halogen-free composition, which may be suitable for use in various electronics. It is further desired to provide a composition that is capable of rapidly curing in the presence of heat and/or at room temperature.

SUMMARY OF THE INVENTION

One aspect of the present invention provides a two-part curable composition including: a first part including: at least one (meth)acrylate monomer; a first halogen-free elastomer; a catalyst; and a free radical stabilizer; and a second part including: at least one (meth)acrylate monomer; a second halogen-free elastomer; an amine-based catalyst; and an amine stabilizer; where the first part and the second part may be combined together to form a curable composition.

In another embodiment of the invention, there is provided a two-part curable composition including: a first part including: at least one (meth)acrylate monomer; a first halogen-free elastomer including a styrene-butadiene-styrene block copolymer, where the styrene-butadiene-styrene block copolymer has a styrene content of about 37% to about 43% by weight of the copolymer; an acid catalyst; a free radical initiator; and a free radical stabilizer; and a second part including: at least one (meth)acrylate monomer; a second halogen-free elastomer including a styrene-butadiene-styrene block copolymer; an amine accelerator; a metal catalyst; and triphenyl phosphine; where the first part and the second part are combined together to form a curable composition.

In still another embodiment of the present invention, there is provided a method of adhering components of an electronic device, including the steps of: Providing a first part including: at least one (meth)acrylate monomer; a first halogen-free elastomer including a styrene-butadiene-styrene block copolymer; an acid catalyst; a free radical initiator; and a free radical stabilizer; providing a second part including: at least one (meth)acrylate monomer; a second halogen-free elastomer including a styrene-butadiene-styrene block copolymer; an amine accelerator; a metal catalyst; and triphenyl phosphine; mixing the first part and the second part to form a curable composition; and applying the curable composition to at least one component of an electronic device.

In another embodiment, there is provided a method of preparing a two-part curable composition, including the steps of: Providing a first set of components including: at least one (meth)acrylate monomer; a first halogen-free elastomer including a styrene-butadiene-styrene block copolymer; an acid catalyst; a free radical initiator; and a free radical stabilizer; mixing the first set of components to form a first part; providing a second set of components including: at least one (meth)acrylate monomer; a second halogen-free elastomer including a styrene-butadiene-styrene block copolymer; an amine accelerator; a metal catalyst; and triphenyl phosphine; and mixing the second set of components to form a second part.

DETAILED DESCRIPTION OF THE INVENTION

The inventive compositions of the present invention are useful in a variety of end-use applications including adhesive, sealant, coating and potting applications, and art particularly useful in the electronic, automotive and other material-sensitive applications. For instance, the present compositions are useful for bonding casings and internal components of various personal electronics, such as laptop computers, personal music players, GPS devices, video display devices (such as televisions and other video players) and other similar products. An adhesive composition used in such personal electronic devices should have a high impact strength so as to maintain adhesion if the device is accidentally dropped by the user. The low glass transition temperatures of the inventive compositions allow the product to be used for low temperature applications and still maintain integrity.

As used herein, the terms "cure" and "curing" refer to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

As used herein, the terms "halo" and "halogen" are intended to be synonymous, and both are intended to include elements commonly classified as "halogens", such as chlorine, fluorine, bromine, and iodine. The term "halogen-free" refers to a composition or component that is substantially free of any halogens. Most desirably, a "halogen-free" component is completely free of any halogens.

The present invention is a two-part curable composition. The curable composition of the present invention is desirably rapidly curable at room temperature. Thus, at room temperatures, the two-part composition is capable of curing in about 10 minutes to about 60 minutes, and most desirably in about 10 minutes to about 30 minutes. At elevated temperatures, the two-part composition of the present invention may cure at an even faster rate (referred to herein as an "ultra fast" cure). At temperatures of about 60-90° C., ultra fast compositions described herein are capable of curing in about 10 minutes to about 60 minutes, and most desirably in about 10 minutes to about 30 minutes.

Curable compositions may include a one-part curable composition or a multi-part curable composition, wherein the various parts are combined together to form the curable composition. The inventive composition described herein desirably is a two-part curable composition, the two parts including a first part and a second part. The first and second parts may be separately stored until curing of the composition is desired. In use, the first and second parts are mixed together and applied to the desired surface or surfaces to which bonding is desired. As explained above, the composition may then cure at a fast rate (or ultra fast rate if heat is applied).

The first part desirably includes at least one (meth)acrylate. As used herein, the term "(meth)acrylate" includes both acrylates and methacrylate monomers. The first part may include any desired (meth)acrylate monomers including, without limitation, such monomers as (meth)acrylic acid, methyl (meth)acrylate, ethyl(meth)acrylate, n-propyl(meth)acrylate, isopropyl(meth)acrylate, n-butyl(meth)acrylate, isobutyl (meth)acrylate, tert-butyl(meth)acrylate, n-pentyl(meth) acrylate, n-hexyl(meth)acrylate, cyclohexyl(meth)acrylate, n-heptyl(meth)acrylate, n-octyl(meth)acrylate, 2-ethylhexyl (meth)acrylate, nonyl(meth)acrylate, decyl(meth)acrylate, dodecyl(meth)acrylate, phenyl(meth)acrylate, tolyl(meth) acrylate, benzyl(meth)acrylate, 2-methoxyethyl(meth)acrylate, 3-methoxybutyl(meth)acrylate, 2-hydroxyethyl(meth) acrylate, 2-hydroxypropyl(meth)acrylate, stearyl(meth) acrylate, glycidyl(meth)acrylate, 2-aminoethyl(meth) acrylate, γ-(methacryloyloxypropyl)trimethoxysilane, (meth)acrylic acid-ethylene oxide adduct, etc. Most desired is a combination of mono-, di- and tri-functional monomers, such as isobornyl acrylate, 1,3-butylene glycol dimethacrylate and tri-methyl propanol trimathacrylate. However, any (meth)acrylate or (meth)acrylates may be used in the present invention.

The first part may include any combination of (meth)acrylate monomers. The (meth)acrylate monomer may be present in the first part in amounts of from about 30% to about 80% by weight of the first part. More desirably, the (meth)acrylate monomer may be present in the first part in amounts of from about 40% to about 70% by weight of the first part.

In one embodiment, the (meth)acrylate may have the general structural formula I.

$$H_2C=CGCO_2R^2 \quad (I)$$

where G may be hydrogen or alkyl of 1 to about 4 carbon atoms, and $R^2$ may be selected from alkyl, cycloalkyl, alkenyl, cycloalkenyl, alkenyl, aralkyl or aryl groups 6 to about 16 carbon atoms, any of which may be optionally substituted or interrupted as the case may be with oxygen, carbonyl, hydroxyl, ester, carboxylic acid, urea, urethane, carbonate amine, amide, sulfur, sulfone and the like.

In another embodiment, the (meth)acrylate may have general structural formula II:

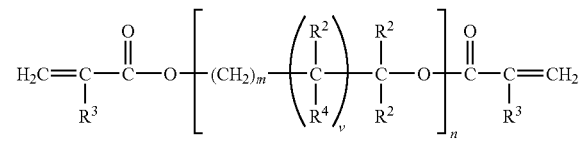

(II)

where $R^2$ may be selected from hydrogen, alkyl of 1 to about 4 carbon atoms, hydroxyalkyl of 1 to about 4 carbon atoms or

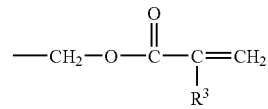

where $R^3$ may be selected from hydrogen and alkyl of 1 to about 4 carbon atoms; $R^4$ may be selected from hydrogen, hydroxy and

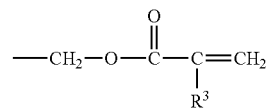

where m is an integer equal to at least 1, e.g., from 1 to about 8 or higher, for instance, from 1 to about 4; n is an integer equal to at least 1, e.g., 1 to about 20 or more; and v is 0 or 1.

The first part desirably includes an effective amount of a halogen-free elastomer. The elastomer component is useful in providing added strength and stability to the cured composition. As explained above, the traditional use of halogens in bonding of personal electronic equipment may be harmful to the electronic equipment due to the corrosiveness of the halogenated compound. As such, the elastomer used in the present invention is desirably halogen-free. The halogen-free elastomer may be present in the first part in any desired amount, and particularly may be present in amounts of from about 10% to about 50% by weight of the first part. More desirably, the halogen-free elastomer may be present in the first part in an amount of from about 20% to about 40% by weight of the first part.

Any halogen-free elastomers may be useful in the present invention. Particularly useful are butadiene-styrene and styrene-isoprene/styrene elastomers. Other elastomers useful in the present invention include those which have a block polystyrene-isoprene-styrene copolymer and those which have a styrene-butadiene-styrene copolymer structure, such as that marketed under the trade name Kraton D-1155ES (a styrene-butadiene-styrene block copolymer having a 40% styrene content). The elastomer or elastomers may be incorporated into the first part in the form of pellets, or they may be added in the form of a fluid. When the elastomers are added to the (meth)acrylate component, the (meth)acrylate acts as a solvent for the elastomer, incorporating the elastomer into the (meth)acrylate backbone during curing. This combination provides extra support and strength to the final cured composition.

In one particular embodiment wherein the elastomer is a styrene-butadiene-styrene block copolymer. In a preferred styrene-butadiene-styrene block copolymer, the styrene may be present in an amount of about 30-50% by weight of the copolymer, and more desirably is present in an amount of about 37-43% by weight of the copolymer. Most desirably, the styrene is present in an amount of about 40% by weight, and the butadiene is present in an amount of about 60% by weight. Elastomers having a lower styrene content may be used if desired; however, the preferred elastomer has a styrene content of about 40% by weight of the copolymer. Such lower-styrene containing styrene-butadiene-styrene copolymers include those marketed under the trade name Kraton D-1101K (31% styrene content), and Kraton D-1116ES (23% styrene content).

One particularly useful embodiment of the present invention incorporates only one elastomer in the first part (preferably a halogen-free elastomer), as opposed to a combination of various elastomers in the first part. For example, the first part may include a desired amount of one styrene-butadiene-styrene block copolymer elastomer. As will be set forth in more detail in the Examples below, such formulation marks an improvement over prior curable compositions which have traditionally required a plurality of elastomers in combination to achieve a desired strength in the cured product. For example, in one previously-known composition, the composition included a mixture of acrylonitrile butadiene, vinyl terminated butadiene, and a chlorosulfonated elastomer. This combination was deemed important to achieve a desired strength in the cured product. Not only did this previous composition include an undesirable halogenated composition, but removal of any one elastomer was found to greatly reduce the impact strength of the cured product. The present invention, in contrast, is capable of providing desired strength and integrity through the use of only one elastomer. Alternatively, of course, the present invention may include a combination of elastomers if desired, but such combination is not necessary.

The first part of the inventive compositions may include any number of free radical initiators to aid in curing. In particular, such free radical initiators may include peroxides and peroxy compounds, such as T-butyl peroxide, T-butyl perbenzoate, cyclohexanone peroxide, and combinations thereof. Peroxides and peroxy compounds may be present in any desired amount, and are desirably present in an amount of from about 0.5% to about 5% by weight of the first part.

The first part may additionally include an acid based catalyst, such as acrylic acid, (meth)acrylic acid, and combinations thereof. In one embodiment, the first part may include acrylic acid in an amount of from about 1% to about 5% by weight of the first part. The first part may additionally include (meth)acrylic acid in an amount of from about 5% to about 40% by weight of the first part.

The first part may include any number of suitable fillers and filler additives. Such fillers include, but are not limited to silicas, fumed silicas, zirconium silicate, hydroxides such as those of calcium, aluminum, magnesium, iron and the like. Other fillers such as diatomaceous earth, carbonates such as sodium, potassium, calcium and magnesium may be employed. Calcium clay, graphite, and synthetic fibers may also be incorporated. Additionally, the first part may include waxes and glass beads. Mixtures of fillers are contemplated. The filler and/or fillers may be present in any desired amount and in one embodiment are present in an amount of from about 1% to about 5% by weight of the first part.

The first part may also include one or more free radical stabilizers so as to stabilize the oxygen in the peroxide component. Any desired free radical stabilizers may be used in the present invention. Suitable free radical stabilizing agents for use in inventive adhesive compositions comprising one or more cyanoacrylate monomers include hydroquinone, hydroquinone monomethyl ether, catechol, pyrogallol, benzoquinone, 2-hydroxybenzoquinone, p-methoxy phenol, t-butyl catechol, butylated hydroxyanisole, butylated hydroxytoluene, and t-butyl hydroquinone and mixtures or combinations thereof. Of particular use as free radical stabilizers are phosphonates, such as 1-hydroxyethylidene-1,1-diphosphonic acid (marketed under the trade name Dequest 2010).

The free radical stabilizers may be used in the first part in any desired amount, and may be present in an amount suitable for stabilization of peroxides incorporated into the first part. The term "stabilization amount" refers to the amount of free radical stabilizer required to effectively stabilize the first part. For example, the free radical stabilizers may be present in an amount of from about 0.05% to about 2% by weight of the first part. If less peroxide is incorporated into the first part, a lesser amount of free radical stabilizers may be incorporated so as to achieve a proper stabilization amount.

The second part of the invention is a separate combination of components which is particularly designed to react with the first part to form the inventive curing composition. As with the first part, the second part includes an amount of (meth)acrylate monomers. The second part may include one (meth)acrylate monomer or it may include a combination of various (meth)acrylate monomers. Desirably, the second part contains the (meth)acrylate monomer(s) in an amount of from about 30% to about 70% by weight of the second part. More desirably, the (meth)acrylate monomer(s) may be present in an amount of about 40% to about 70% by weight of the second part.

The second part also may contain any number of halogen-free elastomers, including those described above. Particularly desired are elastomers having a styrene-butadiene-styrene block copolymer, and most desired are styrene-butadiene-styrene block copolymers having a styrene content of about 37% to about 43% by weight of the copolymer. The halogen-free elastomer or elastomers may be present in an amount of from about 10% to about 40% by weight of the second part. As with the first part, the halogen-free elastomer(s) provides strength and stability to the final cured composition.

The second part may include one or more fillers, including those described above. Desirably, fillers may be present in the second part in an amount of from about 2% to about 6% by weight of the second part.

The second part may additionally include one or more catalysts. Suitable catalysts for the second part include amine-containing catalysts such as butylaldehyde-aniline, or metal catalysts such as copper napthanate solution. If used, the amine-containing catalyst may be present in any desired amount so as to achieve curing of the final composition, and desirably may be present in an amount of from about 3% to about 10% by weight of the second part. Desirably, if used, the copper catalyst is present in an amount of from about 0.01% to about 2% by weight of the second part.

In addition to, or as an alternative to the catalysts set forth above, the second part may optionally include one or more accelerants, including amine accelerators, such as dihydrophenylpyridine. Such accelerants may be present in an amount of from about 3% to about 10% by weight of the second part.

The second part may additionally include one or more stabilizers for stabilizing the catalysts described above. Particularly in embodiments incorporating an amine-containing catalyst (such as butylaldehyde-aniline), the use of an amine stabilizer may be especially useful. Any desired stabilizer may be used, including, for example, phosphines such as triphenyl phosphine. Other stabilizers may be used, including hydrogen-donating antioxidant such as hindered phenol: butylated-hydroxytoluene or benzofuranones another most effective antioxidant. The stabilizer may be present in the second part in an amount suitable to stabilize the catalyst in the second part. Desirably, the stabilizer is present in an amount of from about 0.05% to about 0.90% by weight of the second part.

The two parts of the two-part composition may be separately mixed and stored until the user is ready to prepare the curable composition. For example, the first part may be mixed and stored in a first package, and the second part may be mixed and stored in a second package. The two packages may be housed together, so that the combination of the first and second parts can take place at the user's convenience. The first part should be maintained physically separated from the second part until curing is desired, so as to avoid unintentional mixing and thus curing of the final composition. The two-part curable composition may be maintained as part of a kit, the kit containing the first and second parts housed separately.

The curable composition may be prepared by combining the first part and the second part together to form a curable composition. As set forth above, the curable composition is capable of curing in about 10 minutes to about 60 minutes, at any desired temperatures. The first and second parts may be combined in any desired amounts, and are desirably combined in a weight ratio of about 2:1 (first part to second part). However, the first part may be present in an amount that is about 1.5 to about 2.5 times as high as the second part.

After the first and second parts are mixed together to form a combined composition, the combined composition may be applied to a substrate as necessary to achieve the desired bonding and adhesion. The substrate may include plastic materials or metal materials, such as steel, aluminum, and the like. The substrate may include ink-coated metals. For example, the two-part composition may be applied to the top and/or bottom parts of a casing for a personal electronic device, thereby securing the casing together. In one method of bonding a casing, the first and second parts are combined to form the curable composition. The curable composition is then applied to at least one of a top part or a bottom part of a casing for a portable electronic device. The amount of composition applied to the casing may vary as desired so as to effectively secure the casing together. The top and bottom parts are then held together until the composition has cured, thereby securing the top part to the bottom part of the device. The composition desirably cures in a time that allows the user to apply the composition to the substrate and set any other pieces in position to be adhered to the substrate. If desired, the uncured composition may be subjected to heat so as to speed up the cure time.

The cured composition of the present invention displays high strength and stability. In some embodiments, the cured composition may have an impact strength of at least 30 joules (measured by using a "drop test" wherein a 15 kg weight is dropped a distance of 1 meter). Desirably, the cured composition has an impact strength of at least 20 joules (as measured by the above drop test). Further, it is desired that the cured composition have a shear strength of at least 2,000 psi, and most desirably at least 2,500 psi. The cured compositions of the present invention are desirably strong enough once cured to maintain their adhesiveness and integrity upon impact. Such strength is particularly important when used in portable personal devices, which may be accidentally dropped by the user. In addition, the curable composition should be capable of withstanding temperature as low as $-50°$ C. once cured.

The present invention further provides a method of using a two-part curable composition suitable for adhesion in electronic systems. The method includes applying a halogen-free, non-corrosive curable composition to one or more parts of an electronic device, providing secure adhesion and attachment thereto. In such methods of use, the first part of the curable composition as set forth above is provided to a user. Separately, the second part of the curable composition as set forth above is provided to the user. The user may then mix the first and second parts together to form a curable composition. Once the curable composition is prepared, the user may then apply a desired amount of the curable composition to one or more desired substrates. In one embodiment, the substrate may be a casing of an electronic device, such as a computer or PDA. The user may then allow the curable composition to cure, either at room temperature or at elevated temperatures, thereby providing a secure and non-corrosive adhesion of the desired parts of the electronic device.

A method of preparing the two-part curable composition is also provided herein. In such method, the first part, as described above, is first prepared by mixing the desired components of the first part together. This first part may then be stored in a first package. The second part, as set forth above, is also prepared by mixing the desired components of the second part together. This second part may then be stored in a second package. Desirably, the first and second packages are maintained such that the first and second parts of the composition are kept physically separate from each other. The first and second packages may themselves be housed in a package, so that the first and second compositions may be kept in proximity to each other for convenience when the user is ready to prepare the curable composition.

EXAMPLES

Example 1

Two-Part, Halogen-Free Curable Compositions

A two part curable composition is prepared according to the composition set forth in Table 1 below:

TABLE 1 two-part curable composition

Part A

| Component | Wt. Percentage (of Part A) |
| --- | --- |
| (meth)acrylate monomer(s) | 20.0-60.0 |
| halogen-free elastomer | 10.0-50.0 |
| peroxide(s) | 0.5-5.0 |
| acrylic acid | 1.0-5.0 |
| methacrylic acid | 5.0-40.0 |
| filler(s) | 1.0-5.0 |
| free radical stabilizer(s) | 0.05-2.0 |

Part B

| Component | Wt. Percentage (of Part B) |
| --- | --- |
| methacrylate monomer(s) | 30.0-70.0 |
| halogen-free elastomer | 10.0-40.0 |
| silica | 2.0-6.0 |
| amine catalyst/accelerator | 3.0-10.0 |
| copper catalyst | 0.01-2.0 |
| stabilizer(s) | 0.05-0.90 |

The compositions of Part A and Part B are combined together in an amount of about 2 parts Part A to about 1 part Part B to form the curable composition. The curable composition is capable of curing in about 10 to about 60 minutes at room temperature, or alternatively in about 10 to about 30 minutes at elevated temperatures of about 60-90° C.

Example 2

Comparison of Two-Part Curing Compositions

Four different two-part formulations (Formulas 1-4) were prepared and tested for cure speed, adhesion performance and impact strength. The first formulation was a control formulation, including methyl methacrylate in addition to chlorosulfonated polyethylene. The second formulation was prepared in accordance with the present invention, including methyl methacrylate and a styrene-butadiene-styrene block copolymer (40% styrene content). The third and fourth formulations were prepared with methyl methacrylate and either a vinyl terminated butadiene polymer (third formulation) or an acrylonitrile butadiene (fourth formulation). The compositions of the first and second parts of the formulations are set forth below in Table 2:

TABLE 2

Comparative two-part curable compositions

| | Formula 1 (%) (Control) | Formula 2 (%) (Inventive) | Formula 3 (%) (Comparative) | Formula 4 (%) (Comparative) |
|---|---|---|---|---|
| Part A | | | | |
| methyl methacrylate | 41.85 | 27.65 | 27.65 | 27.65 |
| styrene-butadiene-styrene copolymer | — | 31.00 | — | — |
| vinyl terminated butadiene | — | — | 31.00 | — |
| acrylonitrile butadiene | — | — | — | 31.00 |
| saccharin | — | 0.15 | 0.15 | 0.15 |
| butylated hydroxytoluene | 1.20 | 0.30 | 0.30 | 0.30 |
| trimethyl propane trimethacrylate | — | 6.00 | 6.00 | 6.00 |
| 1,3 butylene glycol dimethacrylate | — | 2.00 | 2.00 | 2.00 |
| isobornyl acrylate | — | 5.00 | 5.00 | 5.00 |
| methacrylic acid | 3.82 | 20.00 | 20.00 | 20.00 |
| acrylic acid | — | 2.00 | 2.00 | 2.00 |
| T-butyl perbenzoate | 0.96 | 2.00 | 2.00 | 2.00 |
| fumed silica | — | 3.00 | 3.00 | 3.00 |
| wax | 0.38 | 0.50 | 0.50 | 0.50 |
| glass beads | 0.30 | 0.30 | 0.30 | 0.30 |
| chlorosulfonated polyethylene | 21.00 | — | — | — |
| HEMA | 10.95 | — | — | — |
| phosphate ester | 2.99 | — | — | — |
| blendex | 14.30 | — | — | — |
| hydrocarbon wax | 0.40 | — | — | — |
| Na EDTA | 0.20 | — | — | — |
| MEHQ | 1.00 | — | — | — |
| Part B | | | | |
| methyl methacrylate | 61.33 | 59.83 | 59.83 | 59.83 |
| styrene-butadiene-styrene block copolymer | — | 32.00 | 32.00 | 32.00 |
| dihydrophenylpyridine (PDHP) | 5.00 | 5.00 | 5.00 | 5.00 |
| antrhaquinone blue dye | 0.09 | 0.05 | 0.05 | 0.05 |
| triphenyl phosphine | — | 0.1 | 0.1 | 0.1 |
| copper napthanate solution | — | 0.002 | 0.002 | 0.002 |
| blendex | 18.18 | — | — | — |
| fumed silica | — | 3.00 | 3.00 | 3.00 |
| barium metaborate | 15.00 | — | — | — |
| polypropylene glycol methacrylate | 0.09 | — | — | — |

Each of the two-part formulations was prepared by combining the components listed in the above tables. Part A and Part B for each formulation (Formulas 1-4) were combined and allowed to cure under various conditions (i.e., room temperature, high temperature). The compositions were then tested for cure speed, impact strength, and adhesion performance on various plastics and metal substrates. The results are set forth in Tables 3-4 below:

TABLE 3

Performance results of comparative two-part curable compositions

|  | Formula 1 (Control) | Formula 2 (Inventive) | Formula 3 (Comparative) | Formula 4 (Comparative) |
|---|---|---|---|---|
| Viscosity (mPa) |  |  |  |  |
| Part A | >60,000 | 20,335 | 25,469 |  |
| Part B | >70,000 | 23,569 | 23,569 | 23,569 |
| Halogen content | >10,000 ppm | N/D | N/D | N/D |
| Accelerated shelf life (82° C.) | Min 3.0 hour | 5 hours | 5 hours | 5 hours |
| Peak exothermic time | >40 min | 14 min | 30 min | >120 min |
| Fixture time | 40 min | 26-30 min | 20-30 min | >30 min |

TABLE 4

Tensile Properties of comparative two-part curable compositions

|  | Formula 1 (Control) | Formula 2 (Inventive) | Formula 3 (Comparative) | Formula 4 (Comparative) |
|---|---|---|---|---|
| Shear strength (psi), cure at RT and 90° C. for 20 minutes | 2,875 | 2,886 | 2,765 | 2,834 |
| Shear strength @ 0 gap on anodized Al | 3,210 | 3,733 | 2,127 | 1,375 |
| Ink coated steel (psi) | N/T | 2,968 | 2,374 | 2,107 |
| IXEF (psi) | N/T | 1,427 | 770 | 683 |
| In-coated steel/IXEF (psi) | N/T | 2,075 | 1,062 | 1,020 |
| Impact strength aluminum (J) | 7.95 | 26.76 | — | — |
| Impact strength steel (J) | 8 | 34 | 10 | 15.62 |
| Aging study (72 hrs at 65° C., 95% RH) | — | 30 | 8 | 6 |

As can be seen, the inventive composition (formulation 2), containing the styrene-butadiene-styrene block copolymer in Part A provided fast fixture with an appropriate open time for manufacturer assembly parts. The inventive composition had a peak exothermic time that was much earlier than the comparative formulations. Such curing properties will be more suitable from a manufacturing standpoint, in that the time it takes the inventive formulation to cure is quick enough to sufficiently support the materials to which it is bonded, but is not too quick so as to impede manufacturing.

In addition, the inventive composition was found to provide improved results in each and every tensile property tested, as compared to the comparative formulations as well as the control formulation. The inventive composition exhibited an improved shear strength on steel, and a significantly improved shear strength on anodized aluminum. In addition, the inventive composition provided improved results on ink coated steel, IXEF polyarylamide, and in-coated steel. Finally, the inventive composition provided much higher impact strength on steel and aluminum as compared to the comparative formulations as well as the control formulation.

The comparative compositions (formulations 3 and 4) provided poor adhesion on aluminum substrates, and also resulted in a low overall impact strength.

Example 3

Effect of Linear Styrene-Butadiene-Styrene Block Polymers with Different Styrene Levels Three styrene-butadiene-styrene block polymers, each having different styrene rubber ratios, were tested in the two-part formulations. The first styrene-butadiene-styrene block polymer had a linear backbone having a 40% styrene content. The second styrene-butadiene-styrene block polymer had a linear backbone having a 31% styrene content. Finally, the third styrene-butadiene-styrene block polymer had a linear backbone having a 23% styrene content. The compositions of the three comparative two-part formulations are set forth in Table 5 below:

TABLE 5

Comparative two-part curable compositions with varying styrene content

| | Formula 2 (%) (Inventive) | Formula 5 (%) (Comparative) | Formula 6 (%) (Comparative) |
|---|---|---|---|
| Part A | | | |
| methyl methacrylate | 27.65 | 27.65 | 27.65 |
| styrene-butadiene-styrene copolymer (40:60 styrene:butadiene) | 31.00 | — | — |
| styrene-butadiene-styrene copolymer (31:69 styrene:butadiene) | — | 31.00 | — |
| styrene-butadiene-styrene copolymer (23:77 styrene:butadiene) | — | — | 31.00 |
| saccharin | 0.15 | 0.15 | 0.15 |
| butylated hydroxytoluene | 0.30 | 0.30 | 0.30 |
| trimethyl propane trimethacrylate | 6.00 | 6.00 | 6.00 |
| 1,3 butylene glycol dimethacrylate | 2.00 | 2.00 | 2.00 |
| isobornyl acrylate | 5.00 | 5.00 | 5.00 |
| methacrylic acid | 20.00 | 20.00 | 20.00 |
| acrylic acid | 2.00 | 2.00 | 2.00 |
| T-butyl perbenzoate | 2.00 | 2.00 | 2.00 |
| fumed silica | 3.00 | 3.00 | 3.00 |
| wax | 0.50 | 0.50 | 0.50 |
| glass beads | 0.30 | 0.30 | 0.30 |
| PM-31 | 0.10 | 0.10 | 0.10 |
| Part B | | | |
| methyl methacrylate | 59.83 | 59.83 | 59.83 |
| styrene-butadiene-styrene copolymer (40:60 styrene:butadiene) | 32.00 | 32.00 | 32.00 |
| dihydrophenylpyridine | 5.00 | 5.00 | 5.00 |
| antrhaquinone blue dye | 0.05 | 0.05 | 0.05 |
| triphenyl phosphine | 0.10 | 0.10 | 0.10 |
| copper napthanate solution | 0.002 | 0.002 | 0.002 |
| fumed silica | 3.00 | 3.00 | 3.00 |

Each of the two-part formulations was prepared by combining the components listed in the above tables. Part A and Part B for each formulation (Formulas 2 and 5-6) were combined and allowed to cure under various conditions (i.e., room temperature, high temperature). The compositions were then tested for cure speed, impact strength, and adhesion performance on various plastics and metal substrates. The results are set forth in Tables 6-7 below:

TABLE 6

Performance results of comparative two-part curable compositions

|  | Formula 2 (Inventive) | Formula 5 (Comparative) | Formula 6 (Comparative) |
|---|---|---|---|
| Viscosity (mPa) | | | |
| Part A | 20,335 | 22,469 | 19,560 |
| Part B | 23,569 | 23,569 | 23,569 |
| Halogen content | N/D | N/D | N/D |
| Accelerated shelf life (82° C.) | 5 hours | 5 hours | 5 hours |
| Peak exothermic time | 14 min | 30 min | >120 min |
| Fixture time | 26-30 min | 20-30 min | >30 min |

TABLE 7

Tensile Properties of comparative two-part curable compositions

|  | Formula 2 (Inventive) | Formula 5 (Comparative) | Formula 6 (Comparative) |
|---|---|---|---|
| Shear strength (psi), cure at RT and 90° C. for 20 minutes | 2,886 | 1,672 | 1,565 |
| Shear strength @ 0 gap on anodized Al | 3,733 | 2,149 | 1,791 |
| Ink coated steel (psi) | 2,968 | 1,367 | 840 |
| IXEF (psi) | 1,427 | 1,168 | 1,026 |
| In-coated steel/IXEF (psi) | 2,075 | 1,344 | 1,129 |
| Impact strength steel (J) | 34 | 10 | 7 |
| Aging study (72 hrs at 65° C., 95% RH) | 30 | 19 | 10 |

As can be seen, inventive composition (formulation 2), containing the styrene-butadiene-styrene block copolymer with a ratio of 40:60 styrene:butadiene provided fast fixture with an appropriate open time for manufacturer assembly parts. The inventive composition had a peak exothermic time that was much earlier than the comparative formulations. Such curing properties will be more suitable from a manufacturing standpoint, in that the time it takes the inventive formulation to cure is quick enough to sufficiently support the materials to which it is bonded, but is not too quick so as to impede manufacturing.

In addition, the inventive composition having a styrene ratio of 40:60 styrene:butadiene was found to provide improved results in each and every tensile property tested, as compared to the comparative formulations having lesser styrene content. The inventive composition exhibited a significantly improved shear strength on steel, anodized aluminum, ink coated steel, IXEF polyarylamide, and in-coated steel. In addition, the inventive composition provided much higher impact strength on steel as compared to the comparative formulations having lesser styrene ratios. Finally, the inventive composition was found to provide better aging results as compared to the comparative formulations having lesser styrene ratios. The styrene-butadiene-styrene block polymer having a styrene ratio of 31:69 styrene:butadiene (Formula 5) demonstrated better tensile strength properties over the polymer having a 23:77 (Formula 6) styrene:butadiene ratio.

Overall, it was determined that the styrene-butadiene-styrene block polymer having a styrene ratio of 40:60 styrene:butadiene performed better than similar polymers having lesser styrene ratios of 31:69 and 23:77 styrene:butadiene. Although comparative formulation 5 (having a 31:69 styrene:butadiene ratio) performed adequately, the inventive formulation using a 40% styrene content copolymer resulted in much better performance and tensile properties.

What is claimed is:

1. A two-part curable composition comprising:
   a. A first part comprising:
      i. at least one (meth)acrylate monomer in an amount within the range of 20 to 60 weight %;
      ii. a first halogen-free elastomer in an amount within the range of about 10 to about 50 weight % comprising a styrene-butadiene-styrene block copolymer having a styrene content of about 37% to about 43% by weight of the copolymer;
      iii. an acid catalyst;
      iv. a free radical initiator; and
      v. a free radical stabilizer; and
   b. A second part comprising:
      i. at least one (meth)acrylate monomer in an amount with in the range of about 30 to about 70 weight %;
      ii. a second halogen-free elastomer in an amount within the range of about 10 to 40 weight %;
      iii. a catalyst; and
      iv. a stabilizer or stabilizing said catalyst;
   wherein when said first part and said second part are combined together a curable composition is formed.

2. The composition of claim 1, wherein said at least one (meth)acrylate monomer comprises at least one monomer selected from the group consisting of methyl methacrylate, butyl methacrylate, isobornyl acrylate, dibutylene dimethacrylate, tri-propanol trimethacrylate, and combinations thereof.

3. The composition of claim 1, wherein said acid catalyst comprises a component selected from the group consisting of acrylic acid, methacrylic acid, and combinations thereof.

4. The composition of claim 1, wherein said free radical initiator comprises at least one component selected from the group consisting of T-butyl peroxide, T-butyl perbenzoate, cyclohexanone peroxide, and combinations thereof.

5. The composition of claim 1, wherein said free radical stabilizer comprises at least one component selected from the group consisting of hydroquinones, butylated hydroxytoluene, and phosphonates.

6. The composition of claim 1, wherein said catalyst comprises at least one component selected from the group consisting of amine catalysts, metal catalysts, and combinations thereof.

7. The composition of claim 1, wherein said stabilizer for stabilizing said catalyst comprises triphenyl phosphine.

8. The composition of claim 1, wherein said curable composition is capable of curing at room temperature in about 10 to about 60 minutes.

9. The composition of claim 1, wherein said curable composition is capable of curing at temperatures of about 60° C. to about 90° C. in about 10 to about 30 minutes.

10. The composition of claim 1, wherein said curable composition is capable of withstanding temperature as low as −50° C. once cured.

11. The composition of claim 1, wherein said curable composition provides impact strength of at least 10 joules as measured by a 15 kg drop test at 1 meter once cured.

12. A two-part curable composition comprising:
a. A first part comprising:
 i. at least one (meth)acrylate monomer in an amount within the range of 20 to 60 weight %;
 ii. a first halogen-free elastomer in an amount within the range of about 10 to about 50 weight % comprising a styrene-butadiene-styrene block copolymer, wherein said styrene-butadiene-styrene block copolymer has a styrene content of about 40% by weight of said copolymer;
 iii. an acid catalyst;
 iv. a free radical initiator; and
 iv. a free radical stabilizer; and
b. A second part comprising;
 i. at least one (meth)acrylate monomer in an amount within the range or about 30 to about 70 weight %;
 ii. a second halogen-free elastomer in an amount within the range of about 10 to about 40 weight % comprising a styrene-butadiene-styrene block copolymer;
 iii. an amine accelerator;
 iv. a metal catalyst; and
 v. triphenyl phosphine;
wherein when said first part and said second part are combined together a curable composition is formed.

13. A method of adhering components of an electronic device, comprising the steps of:
a. providing a first part comprising:
 i. at least one (meth)acrylate monomer in an amount within the range of 20 to 60 weight %;
 ii. a first halogen-free elastomer in an amount within the range of about 10 to about 50 weight % comprising a styrene-butadiene-styrene block copolymer having a styrene content of about 37% to about 43% by weight of said copolymer;
 iii. an acid catalyst;
 iv. a free radical initiator; and
 v. a free radical stabilizer;
b. providing a second part comprising:
 i. at least one (meth)acrylate monomer in an amount within the range of about 30 to about 70 weight %;
 ii. a second halogen-free elastomer in an amount within the range of about 10 to about 40 weight comprising a styrene-butadiene-styrene block copolymer;
 iii. an amine accelerator;
 iv. a metal catalyst; and
 v. triphenyl phosphine;
c. mixing said first part and said second part to form a curable composition; and
d. applying said curable composition to at least one component of an electronic device.

14. The method of claim 13, wherein said first part and said second part are mixed together in a weight ratio of about 2:1 of first part to second part.

15. A method of preparing a two-part curable composition, comprising the steps of:
a. providing a first set of components comprising:
 i. at least one (meth)acrylate monomer in an amount within the range of 20 to 60 weight %;
 ii. a first halogen-free elastomer in an amount within the range of about 10 to about 30 weight % comprising a styrene-butadiene-styrene block copolymer having a styrene content of about 37% to about 43% by weight of said copolymer;
 iii. an acid catalyst;
 iv. a free radical initiator; and
 v. a free radical stabilizer;
b. mixing said first set of components to form a first part;
c. providing a second set of components comprising;
 i. at least one (meth)acrylate monomer in an amount within the range of about 30 to about 70 weight %;
 ii. a second halogen-free elastomer in an amount within the range of about 10 to about 40 weight % comprising a styrene-butadiene-styrene block copolymer;
 iii. an amine accelerator;
 iv. a metal catalyst; and
 v. triphenyl phosphine; and
d. mixing said second set of components to form a second part.

* * * * *